(12) United States Patent
Kuo

(10) Patent No.: US 7,982,134 B2
(45) Date of Patent: Jul. 19, 2011

(54) WIRE BINDING DEVICE

(75) Inventor: Szu-Wei Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 211 days.

(21) Appl. No.: 12/398,453

(22) Filed: Mar. 5, 2009

(65) Prior Publication Data

US 2010/0175909 A1 Jul. 15, 2010

(30) Foreign Application Priority Data

Jan. 9, 2009 (CN) .......................... 2009 1 0300130

(51) Int. Cl.
*H01B 7/00* (2006.01)
(52) U.S. Cl. .................. 174/135; 174/545; 174/40 CC; 248/74.3

(58) Field of Classification Search .................. 174/135, 174/545, 40 CC; 248/71, 74.3; 411/15; 24/302; 432/39
See application file for complete search history.

(56) References Cited

U.S. PATENT DOCUMENTS 7,568,665 B2 * 8/2009 Corbin .......................... 248/74.3
* cited by examiner

*Primary Examiner* — Dhiru R Patel
(74) *Attorney, Agent, or Firm* — D. Austin Bonderer

(57) ABSTRACT

A wire binding device for binding a number of electrical wires of an electronic element, includes a binding member and a fixing member. The binding member includes a base and a binding portion. The base defines a through hole. A first end of the binding portion is connected to the base. A fastening hole is defined in the binding portion and adjacent to the base, and configured for fixing a second end opposite to the first end of the binding portion thereby to bind the number of electrical wires together. The fixing member is configured for fixing the binding member to the electronic element via the through hole.

11 Claims, 5 Drawing Sheets

WIRE BINDING DEVICE

BACKGROUND

1. Technical Field

The present disclosure relates to binding devices, and particularly to a wire binding device for binding wires.

2. Description of the Related Art

Generally, there are a plurality of electrical wires in an electrical device, for example, signal wires and power wires for a motherboard in a computer. Ordinarily, the electrical wires are disorderly and unsystematic when the computer enclosure is assembled. The disordered condition of the wires may inhibit heat dissipation of the motherboard, and may also interfere with maintenance of the computer.

DETAILED DESCRIPTION

Figure 1:
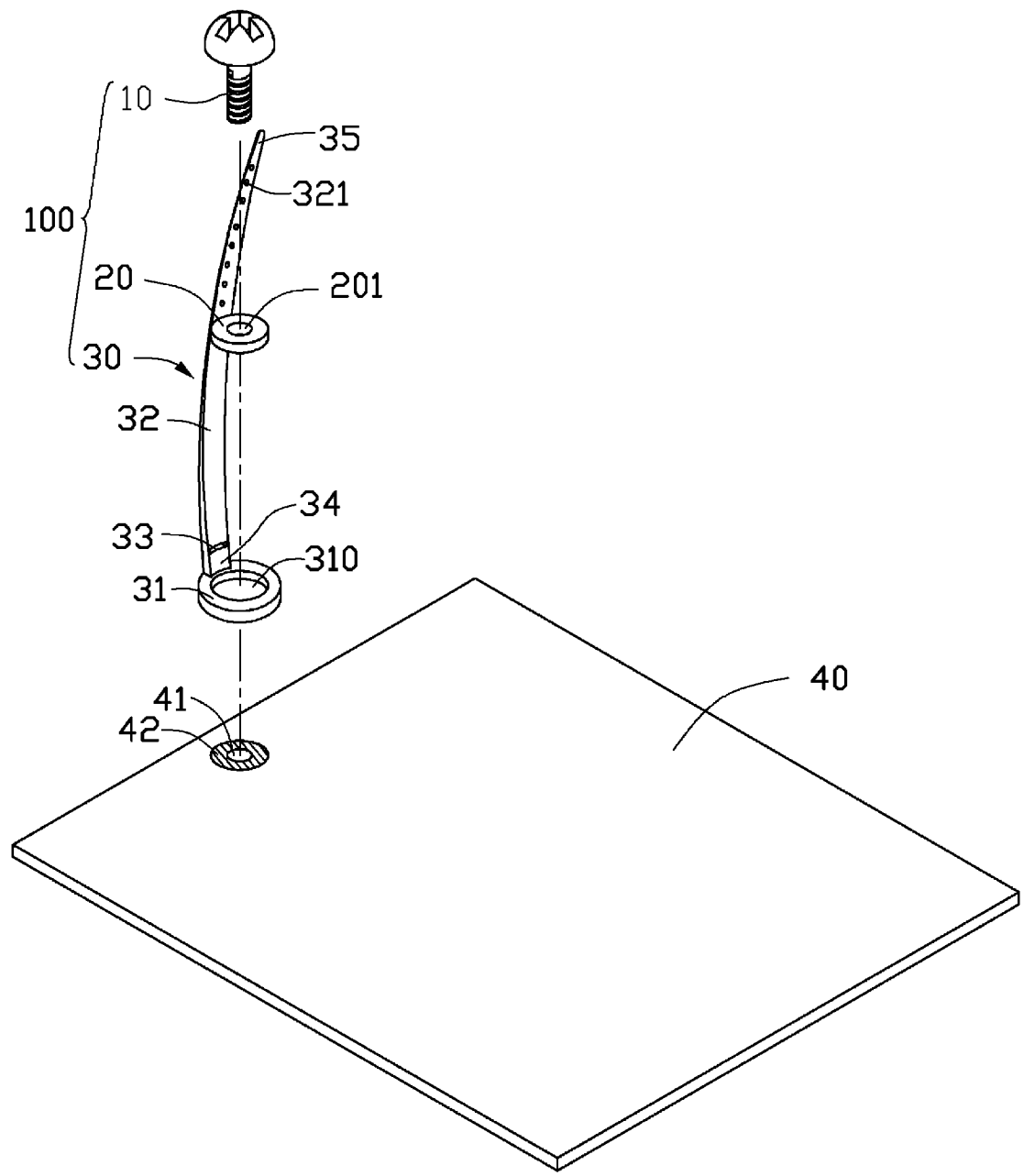
FIG. 1 is an exploded, isometric view of an exemplary embodiment of a wire binding device and a motherboard.
Figure 2:
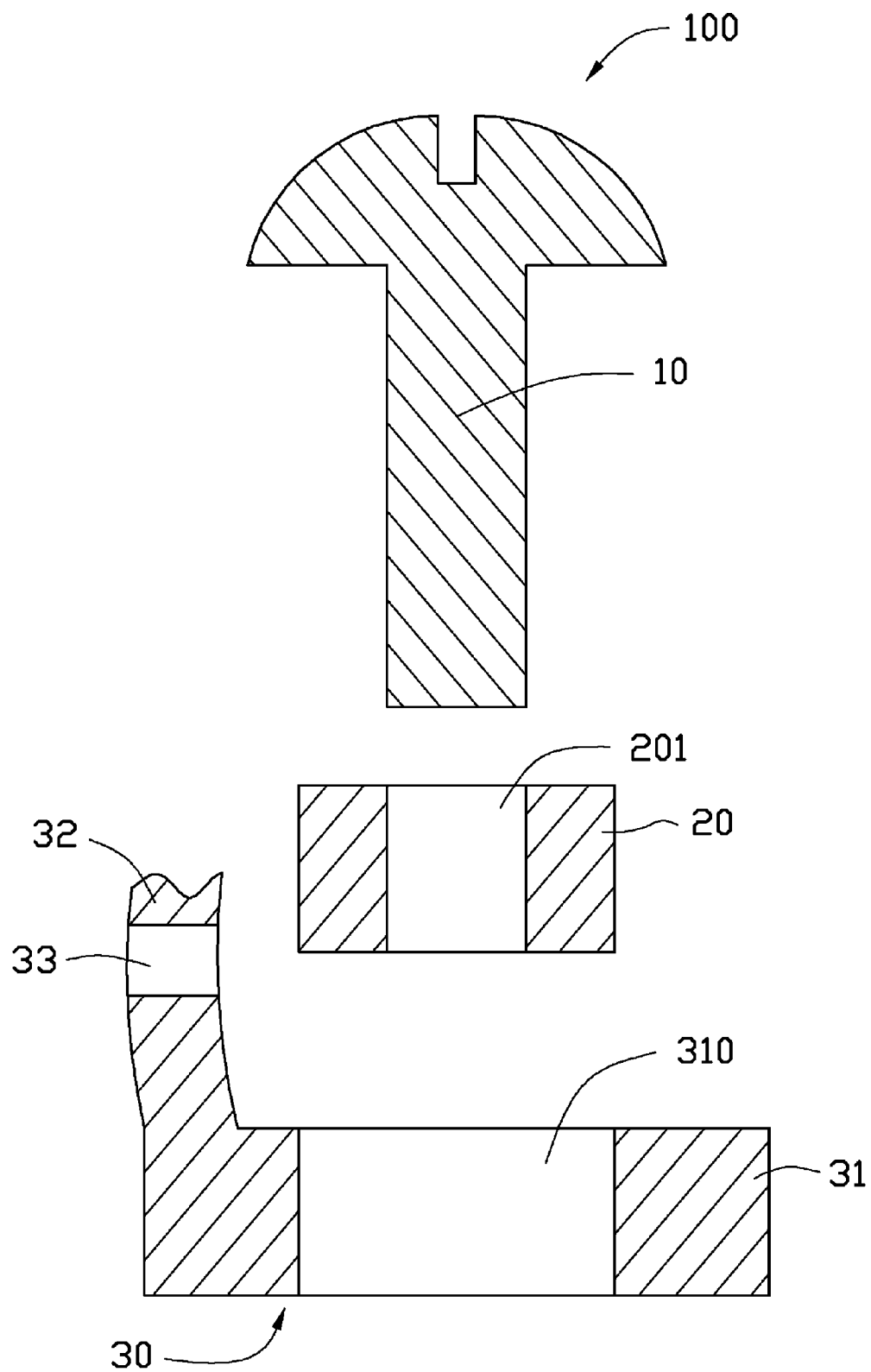
FIG. 2 is a cutaway view of the wire binding device of FIG. 1.

Referring to FIG. 1 and FIG. 2, an exemplary embodiment of a wire binding device 100 includes a fixing member such as a screw 10, a binding member 30 made of non-electrically conductive material, and a metallic conductor 20.

The binding member 30 includes a base 31 and a binding portion 32 integrally extending from a top of the base 31. In one example, the base 31 is circular. The base 31 defines a first through hole 310. The binding portion 32 is pliable and can be curved freely. A first end 34 of the binding portion 32 is connected to the base 31. A fastening hole 33 is defined in the binding portion 32 adjacent to the first end 34 of the binding portion 32, and configured for fixing a second end 35 opposite to the first end 34 of the binding portion 32. A plurality of anti-skid parts 321 are formed on the binding portion 32 adjacent to the second end 35 of the binding portion 32, and configured for preventing the second end 35 of the binding portion 32 from sliding out of the fastening hole 33. The anti-skid parts 321 are wedge-shaped protrusions in this embodiment.

The metallic conductor 20 is circular and defines a second through hole 201. The diameter of the second through hole 201 is large enough for the threaded portion of the screw 10 to extend therethrough. The wire binding device 100 may be mounted to an electronic element, such as a motherboard 40 of a computer. The motherboard 40 defines a screw hole 41. A copper foil 42, which is grounded, is arranged on the motherboard 40 around the screw hole 41.

Figure 3:
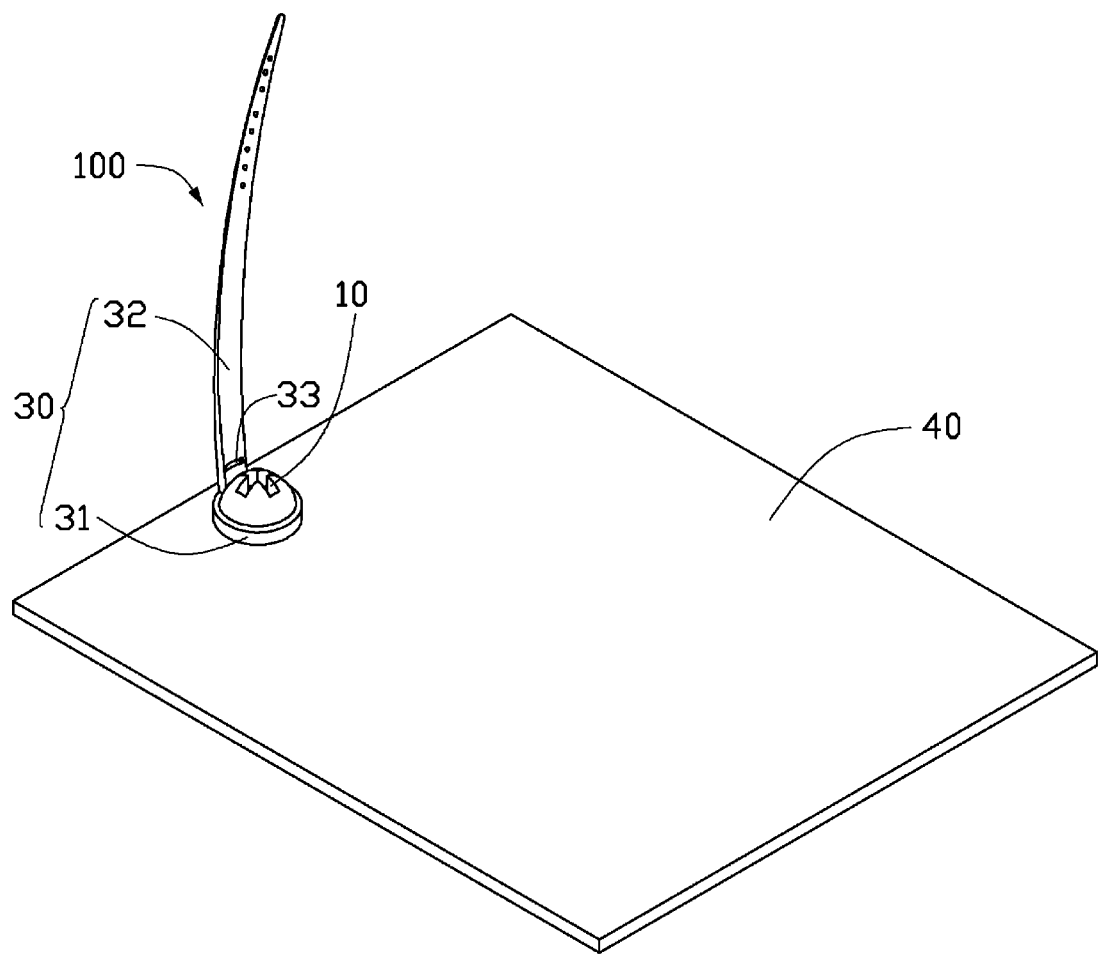
FIG. 3 is an assembled view of the binding device and the motherboard of FIG. 1.
Figure 4:
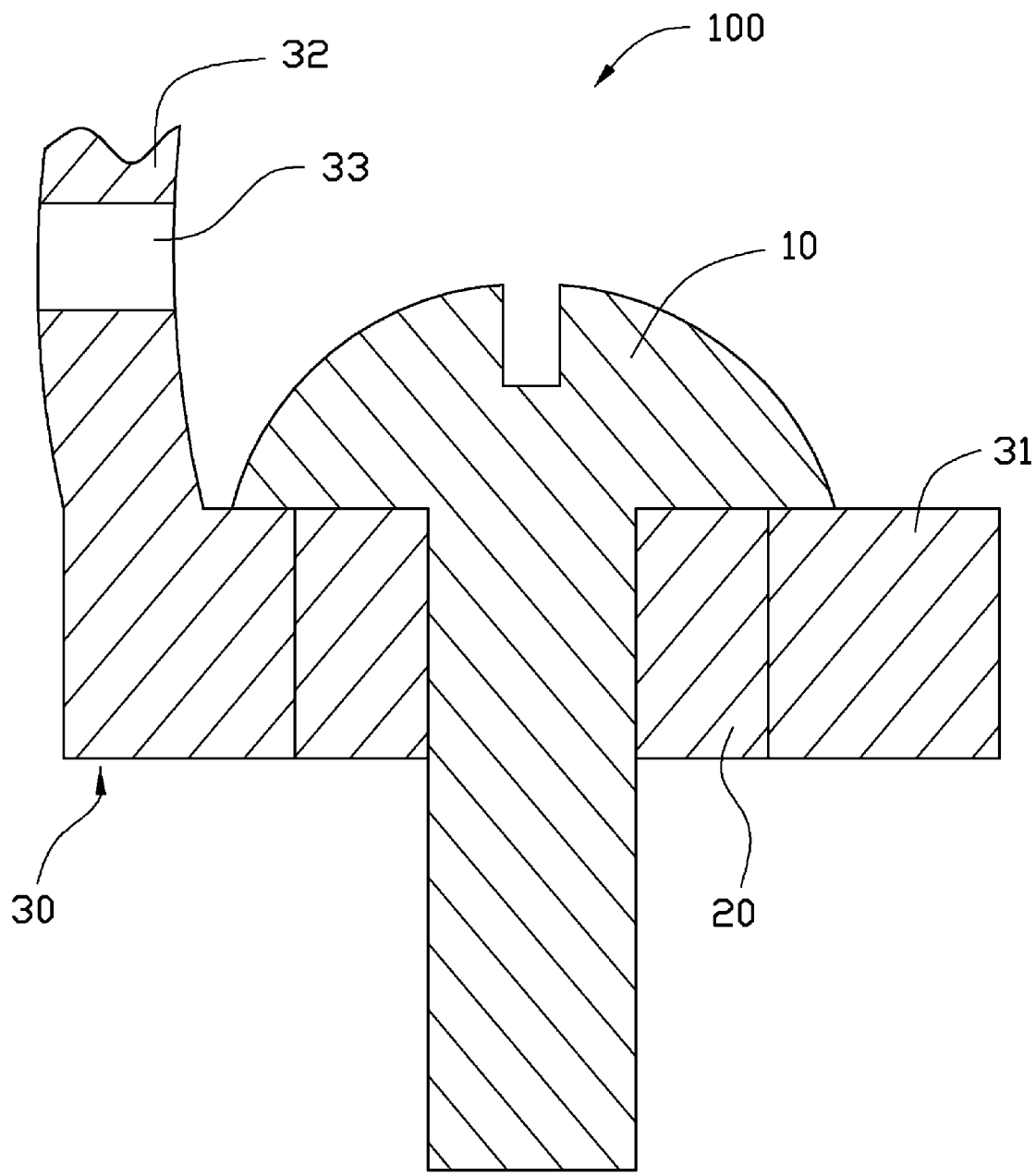
FIG. 4 is a cutaway view of the wire binding device of FIG. 3.

Referring to FIG. 3 and FIG. 4, in assembling the wire binding device 100 to the motherboard 40, the metallic conductor 20 is embedded in the first through hole 310 of the base 31 of the binding member 30. The threaded portion of the screw 10 is extended through the second through hole 201 of the metallic member 20, and engaged in the screw hole 41 of the motherboard 40. The metallic conductor 20 is grounded by contact with the copper foil 42. The metallic conductor 20 eliminates built up static electricity on the binding member 30.

Figure 5:
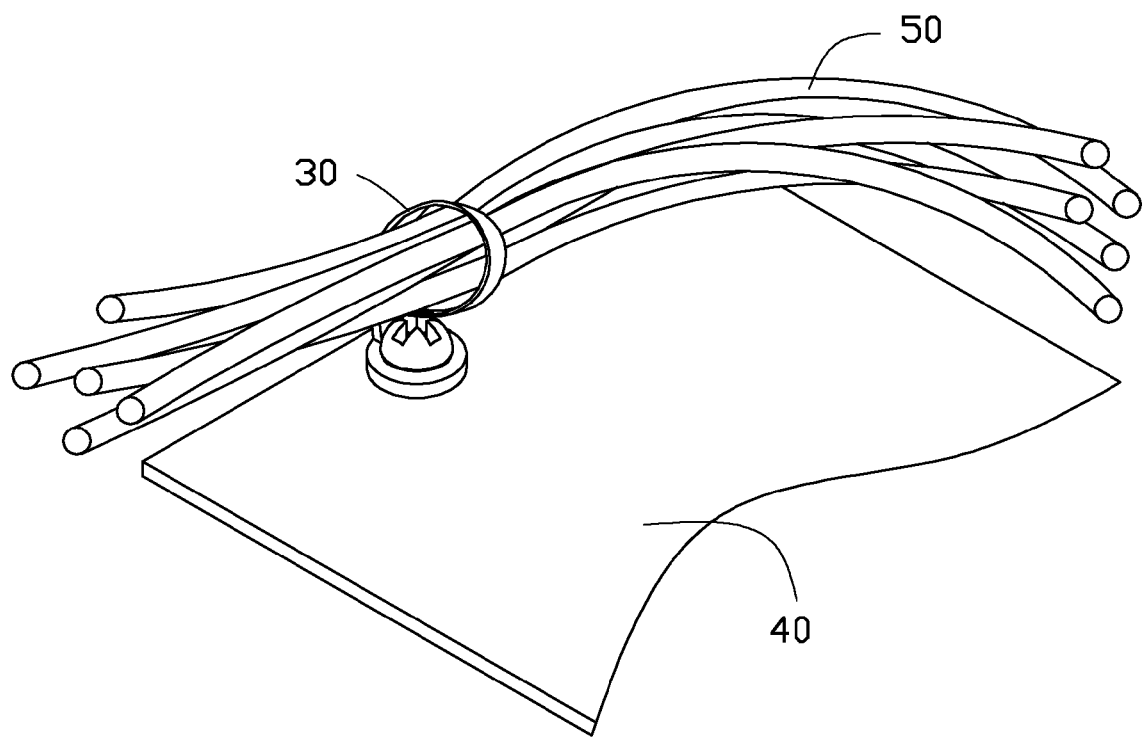
FIG. 5 is an isometric view of the wire binding device of FIG. 3 binding a plurality of electrical wires.

Referring to FIG. 5, in use, the wire binding device 100 is employed to bind a plurality of electrical wires 50 on the motherboard 40. The plurality of electrical wires 50 is collected and bunched adjacent to the binding portion 32 of the wire binding device 100. The second end 35 of the binding portion 32 is engaged in the fastening hole 33, therefore, the binding portion 32 is formed to be a ring to bind the plurality of electrical wires 50 together. The heat dissipation of the motherboard 40 can be improved since the plurality of the electrical wires 50 is orderly arranged.

In other exemplary embodiments, the wire binding device 100 may be mounted to another place of the computer enclosure, for example, the inner wall of the computer enclosure. The metallic conductor 20 may be omitted when there is no copper foil on the inner wall of the computer enclosure, thereby the screw 10 fixes the base 31 to the inner wall of the computer enclosure directly via the first through hole 310 of the binding member 30. Furthermore, the screw 10 may be another fixing member, such as a rivet. The base 31 may be made of another material, such as a piece of thin plastic coated metal.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A wire binding device for binding a plurality of electrical wires of an electronic element, comprising:
    a binding member comprising:
    a base defining a through hole; and
    a binding portion integrally extending from the base and comprising a first end connected to the base and a second end opposite to the first end, wherein the binding portion defines a fastening hole adjacent to the first end, the second end capable of being engaged in the fastening hole to form a ring by the binding portion such that the plurality of electrical wires can be passed through the ring and fixed to the binding portion; and
    a fixing member capable of passing through the through hole of the base of the binding member to fix the binding member to the electronic element.

2. The wire binding device of claim 1, wherein the base is circular.

3. The wire binding device of claim 1, wherein the binding member is made of plastic.

4. The wire binding device of claim 1, wherein the fixing member is a screw.

5. The wire binding device of claim 1, wherein anti-skid parts are formed on the binding portion, adjacent to the second end of the binding portion, to prevent the second end of the binding portion from sliding out of the fastening hole of the binding portion.

6. A wire binding device for binding a plurality of electrical wires of an electronic element, comprising:
    a binding member comprising:
    a base defining a first through hole; and
    a binding portion comprising a first end connected to the base and a second end opposite to the first end, wherein the binding portion defines a fastening hole adjacent to the first end, the second end capable of being engaged in the fastening hole to form a ring by the binding portion, to bind the plurality of electrical wires in the ring;

a metallic conductor embedded in the first through hole of the base, wherein the metallic conductor defines a second through hole; and a fixing member passing through the second through hole of the metallic conductor to fix the binding member and the metallic conductor to the electronic element.

7. The wire binding device of claim 6, wherein the base is circular.

8. The wire binding device of claim 6, wherein the metallic conductor is circular.

9. The wire binding device of claim 6, wherein the binding member is made of plastic.

10. The wire binding device of claim 6, wherein the fixing member is a screw.

11. The wire binding device of claim 6, wherein anti-skid parts are formed on the binding portion and adjacent to the second end of the binding portion, to prevent the second end of the binding portion from sliding out of the fastening hole of the binding portion.

* * * * *